CONTROLLABLE MOTION AND FORCE CONVERTER

Original Filed Feb. 16, 1968 5 Sheets-Sheet 1

CONTROLLABLE MOTION AND FORCE CONVERTER

Original Filed Feb. 16, 1968 5 Sheets-Sheet 2

CONTROLLABLE MOTION AND FORCE CONVERTER

Original Filed Feb. 16. 1968 5 Sheets-Sheet 5

United States Patent Office

Re. 27,711
Reissued July 31, 1973

27,711
CONTROLLABLE MOTION AND FORCE CONVERTER

James P. Steibel, Sturtevant, Wis., assignor to The Dumore Company, Racine, Wis.

Original No. 3,475,972, dated Nov. 4, 1969, Ser. No. 809,462, Mar. 7, 1969, which is a continuation of Ser. No. 706,063, Feb. 16, 1968, which in turn is a continuation-in-part of Ser. No. 628,678, Apr. 5, 1967, both now abandoned. Application for reissue Apr. 6, 1970, Ser. No. 26,180

Int. Cl. F16h *21/16*

U.S. Cl. 74—25 13 Claims

Matter enclosed in heavy brackets [ ] appears in the original patent but forms no part of this reissue specification; matter printed in italics indicates the additions made by reissue.

ABSTRACT OF THE DISCLOSURE

A device for converting a torque force into a linear force directed parallel to the axis of the torque force comprising a rotatable shaft onto which a torque force is applied, a housing surrounding the shaft, the housing including a plurality of bearings each having its outer race peripherally engaging the periphery of the shaft, to be rotatably driven by said shaft about their own axes but being movable axially of the shaft, bearing pivot means for pivoting each bearing about an axis that is perpendicular to both the axis of the bearing and the axis of the shaft, so that a force component is transmitted from the shaft to the bearing which is manifested by development of a force parallel to the axis of the shaft which tends to effect relative movement between the shaft and frame in directions axially of the shaft, and a controller means for selectively effecting substantially identical pivoting of all bearings simultaneously.

This application is a *reissue of U.S. Pat. No. 3,475,972 which was* a continuation of [my copending] application Ser. No. 706,063, filed Feb. 16, 1968, now abandoned for "Controllable Motion and Force Converter," which *was* [is] a continuation-in-part of [my copending] application, Ser. No. 628,678, filed Apr. 5, 1967 now abandoned, for "Threadless Screw Device." The disclosure of said Ser. No. 628,678 is incorporated herein by reference in its entirety.

This invention relates to a device for converting a torque force or rotary motion into a linear force or linear motion having a component parallel to the axis about which the torque force is applied.

Rotary devices, such as electric motors, are the most popular source of work force in use today. The force derivable from the shafts of such rotary devices is a torque force. In many situations it is desirable to convert such a torque force into a linear force, and others have heretofore attempted to devise many different apparatus for such conversion.

The use of a helical inclined plane, appearing most commonly in the form of a screw thread, is one basic type of machine for conversion of a torque force into a linear force. Others have attempted to expand on this ancient and basic concept to provide a form of helical arrangement between a rotating drive shaft and a linear movable part so as to provide for prosecution of motion or force axially of the shaft. Such attempts include Wolff 2,152,518; Prinz 2,234,274; Weathers 2,619,346; Preskitt 2,912,868; Uhing 2,940,322; Pravel 3,046,801; Hauptman 3,081,639; and Hug 3,178,949. Such prior attempts have had limited, if any, success and recent disclosures have resorted to complexity of construction without corresponding increase in claimed benefits or capacity of utility. In a number of instances in the prior art desirable results are sought on employment of large diameter roller means which embrace and surround a rotating shaft of smaller diameter at points spaced axially of the shaft, or by use of smaller diameter rollers engaging the inner wall of a hollow shaft along an axially elongated portion of the shaft.

Thus, one object of this invention is to provide a new and improved device for converting a torque force into a linear force, and vice versa, which device includes new multiple means for control, the availability of which affords great flexibility in achieving variable output from the device.

Another object of this invention is to provide, in an improved device for converting torque force into a linear force, and vice versa, a novel first control for simultaneously, simply, and precisely selectively varying the angle of pitch between the rollers and the shaft, and second control means for selectively individually controlling the bearing force between each roller and the shaft.

Another object of this invention is to provide a multiple axes bearing assembly for use in the controllable motion and force converter device which lends itself to use with the pitch control and bearing force control means of the invention.

It is still another important object of the present invention to provide a motion translating device which is capable of producing a substantial amount of linear thrust with variable feed while economizing on cost and space limitations and which is adaptable for easy tandem mounting (thereby multiplying deliverable thrust) without complex controls.

Still further objects of the invention can be gathered by reference to the following descriptions, drawings and claims, it being noted that the invention may be utilized in multiple applications (i.e., work in on shaft-work out on frame or vice versa).

BRIEF DESCRIPTION OF THE DRAWING

The motion translating device of the present invention is illustrated with reference to a specific embodiment, together with a number of specific illustrations showing the practical application of the device, in the following drawings in which.

DESCRIPTION OF THE PREFERRED EMBODIMENT

Figure 1:
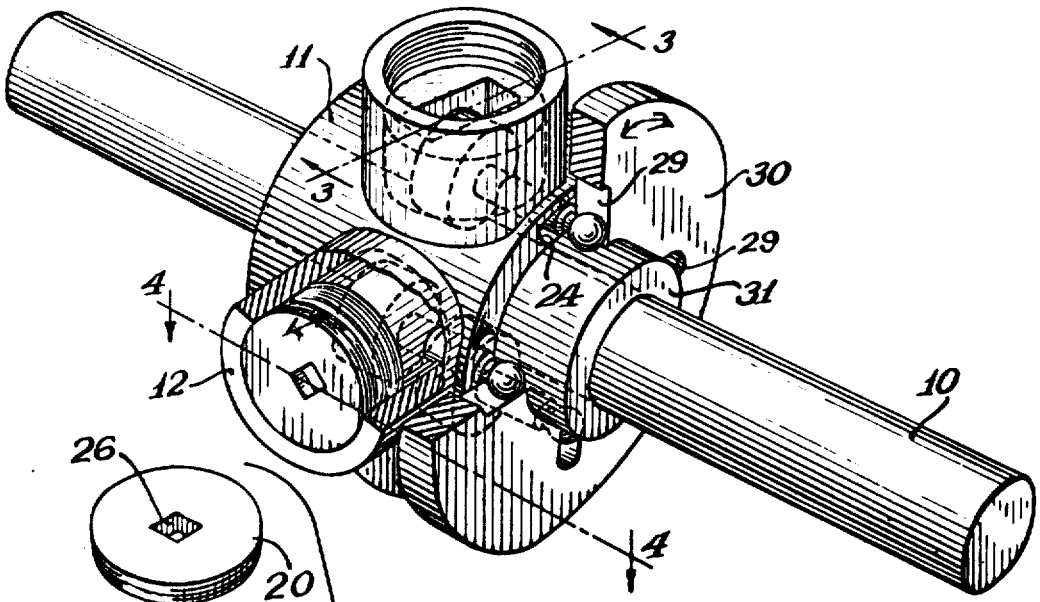
FIG. 1 is a perspective view, partly in section, of one embodiment of the motion translating device of the invention.
Figure 2:
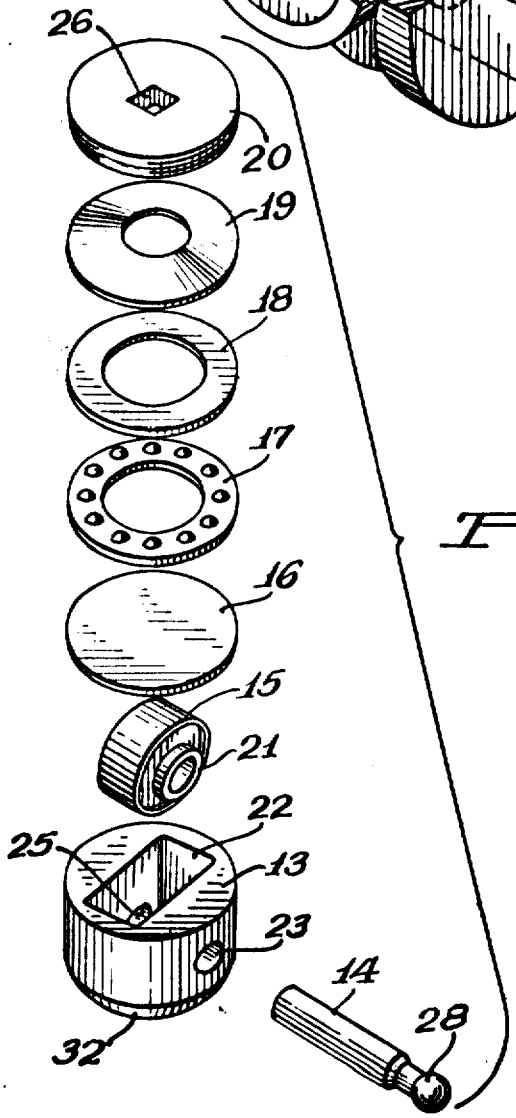
FIG. 2 is an exploded view showing a subassembly of FIG. 1.

Referring to FIG. 1, there is shown a central shaft or tube 10 having mounted thereover a frame or housing 11. On housing 11, there are four wells or socket-defining portions 12 (only two of which are shown) integrally joined thereto and forming a part thereof. Wells 12 are bores radially extending from the shaft with the axes of the bores perpendicular to the axis of the shaft. Within each of the wells 12 there is mounted a bearing assembly, which in the present embodiment is a ball bearing assembly. The elements of the ball bearing assembly are more clearly shown in FIG. 2, which also shows illustrative additional elements useful, when assembled, in controlling the pressure of the bearing on the shaft. Referring to FIG. 2, there is shown a ball bearing housing or carrier 13, a pin 14, a ball ring unit 15, a bearing plate 16, a bearing 17, a bearing washer 18, a spring washer 19, and a threaded screw plug 20. Ball bearing unit 15 has a friction-reducing bearing element 21 for mounting the ball bearing assembly on pin 14. The ball bearing housing 13 has an opening 22 for receiving the ball bearing assembly and holes 23 and 25 for receiving pin 14.

When the ball bearing assembly is to be placed in a socket defining portion or well 12, the ball bearing housing or carrier 13 is first inserted into socket defining portion 12, then ball bearing unit 15 is dropped into opening 22 of the ball bearing housing, and a pin 14 is introduced into an opening 24 in the main housing unit 11 through the hole 23 and a bore in bearing element 21 to the corresponding hole 25 on the opposite wall of the opening 22. The inner cylindrical surface of socket defining portion 12 provides a bearing surface for ball bearing housing 13 so that the latter can rotate therein. The seating of pin 14 within the ball bearing housing 13 is more clearly shown in FIG. 4, to be described below. After the pin 14 has been inserted, the bearing plate 16 is placed on top of ball bearing housing 13 and the bearing 17, bearing washer 18, spring washer 19 and threaded screw plug 20 are mounted in the order shown in FIG. 2. The threaded screw plug 20 is threaded into the socket defining portion 12. The plug 20 has a slot 26 for receiving an Allen type wrench to raise or lower plug 20 within well 12. The lower side of plug 20 has a boss member 27, shown in FIGS. 3 and 4, which extends into the opening of the spring washer to hold the spring washer in position when the plug 20 is raised or lowered. By adjusting the vertical position of plug 20, it can be seen that force will be transmitted through the elements of the ball bearing assembly to ball bearing unit 15. In this manner, the bearing pressure between ball bearing assembly 15 and the central shaft 10 can be adjusted by adjusting the position of plug 20 in well 12. The housing 11 is not in direct contact with central shaft 10 and only indirectly contacts the shafts through the ball bearing units 15.

As shown in FIG. 2, pin 14 is of generally cylindrical configuration having one end terminating in a spherical or ball portion 28, although the specific configuration is not critical. Pin 14 is of sufficient length so that when it is inserted into the ball bearing assembly, the spherical portion 28 extends through slot 24 of housing 11 to rest in a slot 29 on a control plate 30, as shown in FIG. 1. The holes 23 and 25 on ball bearing housing 13 are of a size to permit a tight fit with pin 14. When the ball bearing assembly is put together the entire assembly will move with pin 14 as a substantially rigid unit. The slot 24, as can be seen from FIG. 1, is shaped to permit lateral movement of the spherical portion 28 of pin 14. Thus the axis of pin 14 may be made to be parallel to the axis of the central shaft 10 or to form an angle therewith. The positioning of the pin 14 controls the amount and the direction of linear motion of the shaft vis-a-vis the frame or housing as more clearly indicated in FIGS. 6a, 6b, and 6c.

Figure 6A:
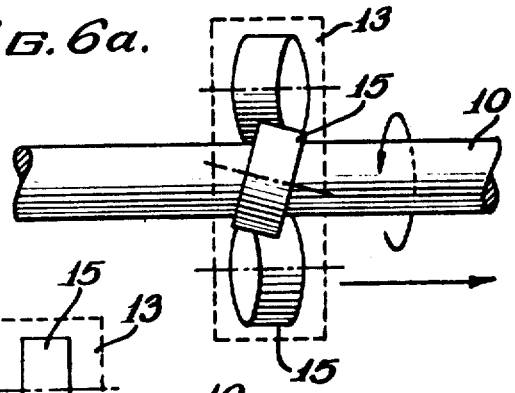
FIGS. 6a, 6b and 6c illustrate the physical principles governing movement of the device of the present invention.
Figure 6B:
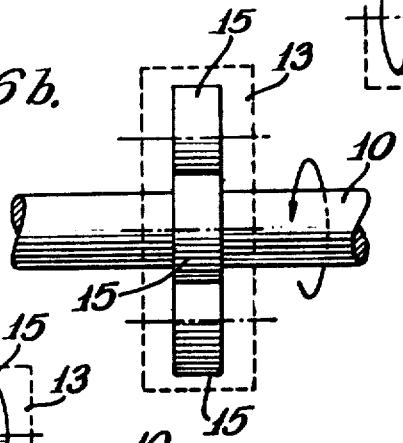
Figure 6C:
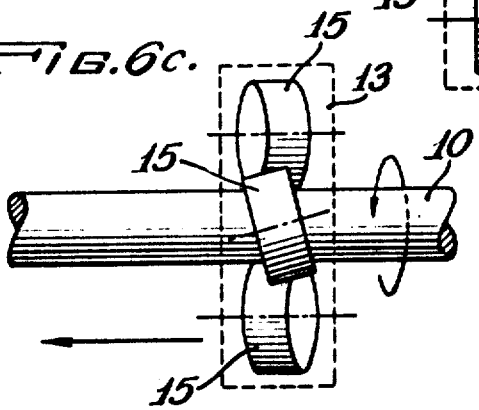

Referring to FIG. 6b, the central shaft 10 is driven by a motor or other means (not shown) in a rotary motion. The ball bearing units 15 are shown in a position where the axes of their pins 14 are parallel to the axis of shaft 10. In this arrangement, the outer races of the ball bearing units 15 will contact and rotate around shaft 10 without imparting axial motion to the frame or housing relative to the shaft 10. The system is in an idle position. In FIG. 6a, the axes of pins 14 of the ball bearing units 15 form a small angle with the axis of the shaft 10 to cause the outer races of the ball bearing units to travel a helical path on the surface of shaft 10 when the shaft is rotated. When the central shaft is rotated in the direction as indicated in FIG. 6a and the frame is held rotationally motionless, the frame, in contact through the ball bearing assemblies, will travel on the shaft from left to right. In FIG. 6c, the axes of pins 14 of the ball bearing units 15 are inclined in a direction opposite to that shown in FIG. 6a. If the central shaft is rotated in the direction as indicated in FIG. 6c, and the frame is held rotationally motionless, the frame, in contact with the shaft through the ball bearing assemblies, will travel on the shaft from right to left.

Numerous variations in work-in, work-out applications of the device of my invention are possible without material hardware modification. For example, it should be evident that the device may be usefully employed by:

(1) Holding the frame axially and rotationally motionless, imparting a desired pitch angle to the various ball bearing units in pressure contact with the shaft, and rotating the shaft either clockwise or counterclockwise with respect to the frame, resulting in axial movement of the shaft.

(2) Holding the shaft axially and rotationally motionless, imparting a desired pitch angle to the various ball bearing units in pressure contact with the shaft, and rotating the frame either clockwise or counterclockwise with respect to the frame, resulting in axial movement of the frame.

(3) Holding the shaft axially motionless, imparting a desired pitch angle to the various ball bearing units in pressure contact with the shaft, and axially moving the frame while holding the frame rotationally motionless, (4) Holding the frame axially motionless, imparting a desired pitch angle to the various ball bearing units in pressure contact with the shaft, and axially moving the shaft while holding the shaft rotationally motionless, resulting in rotational movement of the frame.

Figure 7:
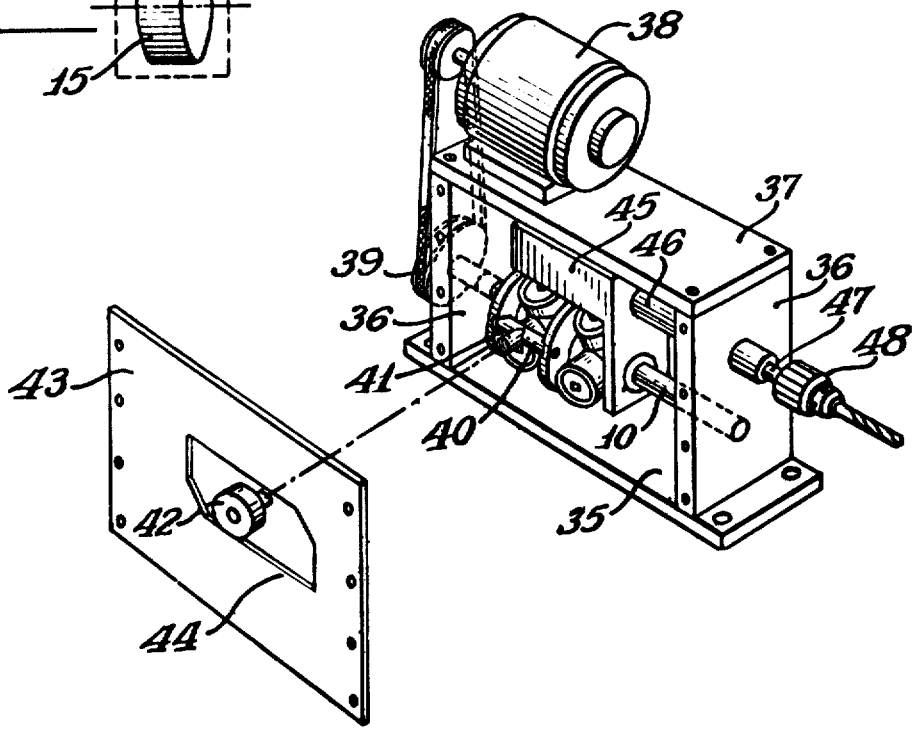
FIG. 7 is a schematic view, partly exploded, showing the use of tandem mounted devices of the present invention in an automatic or semi-automatic drill.

Referring again to FIG. 1, the housing 11 is shown to have a hub 31. Over hub 31, there is provided in sliding engagement a control plate 30 having slots 29 thereon. As indicated above, the spherical portions 28 of pins 14 terminate and rest in slots 29. It should be evident that the precise configuration of spherical portion 28 is not critical and the contact between the pivot pins 14 and control plate 30 may be made in various ways in keeping with the principles of my invention. Slots 29 are constructed to provide a relatively tight fit for the spherical portions 28 so that the pins 14 will not be able to move laterally when control plate 30 is held stationary. It is clear, therefore, that by revolving control plate 30 slightly in either direction of neutral, the axes of the pins 14 will be shifted or steered to a position non-parallel to the axis of shaft 10. In this manner, through use of the ball bearing assemblies pivotally operating within the socket defining portions 12 of the frame 11, movement of control plate 30 will control the direction and the speed of linear movement of shaft 10 relative to the frame 11 when motion is imparted to either the frame or the shaft from an outside source. Various means of positioning control plate 30 are shown in FIGS. 7 et seq. It should be noted that the slots 29 on the control plate 30 should be so located as to synchronize the pivoting of the ball bearing assemblies so that each ball bearing unit 15 cooperates with every other one to produce the maximum amount of linear thrust, and to minimize vibration and wear of the component parts.

Figure 3:
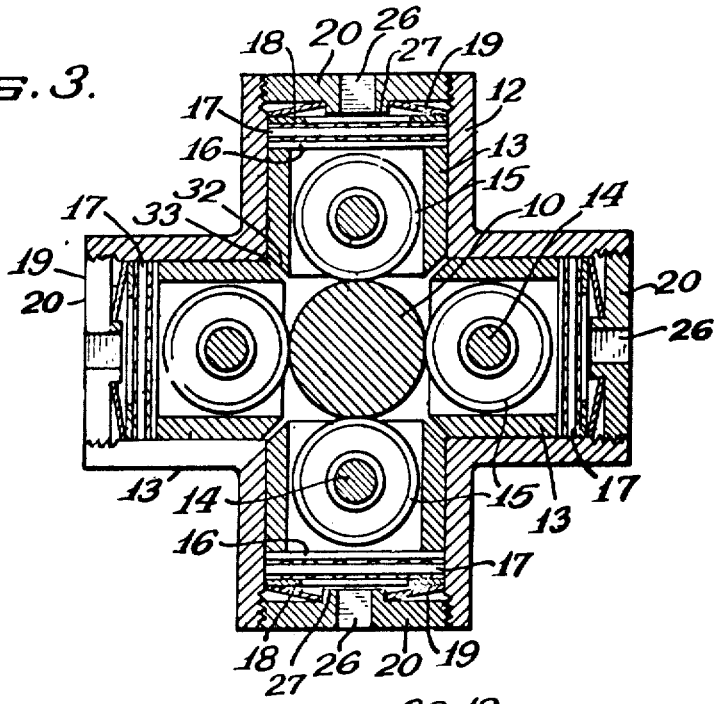
FIG. 3 is a sectional view of the device of FIG. 1 along line 3—3.

In FIG. 3, a sectional view of the device of FIG. 1 along line 3—3 is shown. In this drawing, the central shaft 10 is shown to be surrounded by four ball bearing units 15 although it is clear that more or less than four units can be used. I have found, however, that the use of four ball bearing units optimizes the advantages of my invention and that tandem mounting of four-ball-bearing-unit devices is preferable to increasing the number of ball bearing units thereby apparently decreasing the area of contact with the shaft resulting from the use of smaller diameter ball bearing units. The outer races of the ball bearing units are the only elements in direct contact with shaft 10 and all remaining structure is supported on the shaft through the ball bearing units. Referring to one of the ball bearing units and its associated elements in FIG. 3, it is seen that in socket defining portion 12 there is placed a roller housing or cage 13 in snug fit but not such as to prevent a sliding action between socket defining portion 12 and ball bearing housing 13. Ball bearing housing 13 is shown to have a bevelled bottom portion 32, as also is shown in FIG. 2, to provide a clearance 33 between neighboring ball bearing housing or cages 13. The clearance 33 separates the neighboring ball bearing housings but the bevelled bottom portions 32 cooperate to prevent the ball bearing units 15 and their housings 13 from dropping into the center of the overall housing 11 when the shaft is removed. The plug 20 is threaded into the top threaded portion of socket defining portion 12 and presses the assembly in a downwardly direction to force the ball bearing unit into frictional contact with shaft 10. Through boss member 27, plug 20 maintains the spring washer 19 in position and exerts a force thereon. In its turn, spring washer 19 presses on a force-distributing washer 18 which rides on bearing 17. Bearing 17 presses on the bearing plate 16 which transmits the force onto the top of ball bearing housing 13. The outer surface of the ball bearing unit and the surface of the shaft or tube 10 are preferably heat treated to provide case hardened steel wearing surfaces to minimize wear and damage, thus increasing their useful life. I have found that I can optimize the high thrust characteristics of the device by use of various types of oil which possess unusual properties. The use of these oils apparently causes increased friction at points of high pressure. Thus, at the points of contact between the ball bearing units and the shaft, friction is apparently increased because of the use of the special oil.

Figure 4:
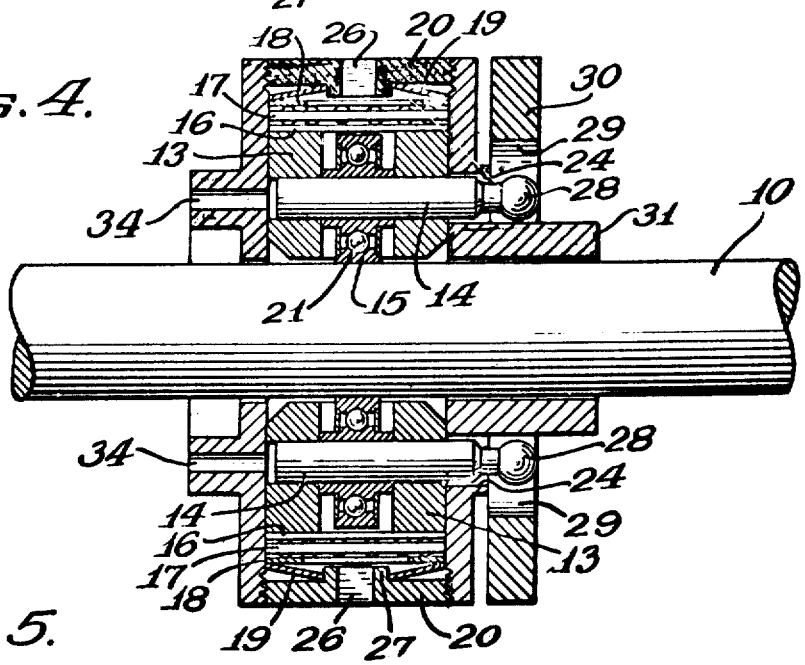
FIG. 4 is a sectional view of the device of FIG. 1 taken along line 4—4.

FIG. 4 is another sectional view of the device of FIG. 1, taken along line 4—4. In this figure the pin 14 is more clearly shown in position within the assembly. Thus, pin 14 is relatively tightly held in place by the ball bearing unit housing 13. For ease in removing pin 14 when disassembling the unit, a hole 34 is provided on ball bearing unit housing 13 for insertion of an instrument to knock out the pin 14 through slots 24 and 29. It should be noted that both slots 24 and 29 have sufficient vertical clearance for pin 14 to allow movement of the pin due to the action of the control plate 30 or the spring washer 19 on the pin.

Figure 5:
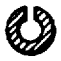
FIG. 5 is a sectional view of another embodiment of the pin shown in FIG. 2, as hereinafter described.

FIG. 5 shows a cross section of a modified pin 14. The pin in FIG. 5 has a hollow central portion and a longitudinal open slot on its surface substantially along the entire length of the body portion of the pin. This embodiment of pin 14 permits less precise machining of the pin and still obtain the desired tight fit as herein described.

FIG. 7 shows schematically an application of the device of the present invention in an automatic drill mechanism. In this drawing, there is shown a base 35 having two substantially parallel side walls 36 thereon which support a top wall 37. A shaft 10 is mounted on vertical walls 36 to permit rotation of the shaft. A motor 38 and pulley means 39 are provided for rotating shaft 10. On the shaft, there are provided two tandemly mounted units on the device shown in FIG. 1. As is clear from the present description, more than one unit of the device of the invention may be used to produce the desired amount of linear thrust. When two or more units are employed as shown in FIG. 7, they should be synchronized in that the control plate of each unit is rigidly attached to all other control plates so that they move in unison and in the same manner. This is accomplished in the embodiment of FIG. 7 by means of a rigid bar 40 securely attached to both of the control plates of the two units. More than one such structural bar may be necessary to maintain the control plates in synchronization, depending on the particular situation. Also rigidly attached to the bar member 40 is a shaft member 41 which serves as the axle for roller 42. A template 43 is mounted on base 35, vertical walls 36 and top wall 37. In FIG. 7, the template 43 is shown away from the base and wall members for clarity. Roller 42 rides on a cutout portion 44 on the template 43. When motor 38 and pulley means 39 activate shaft 10 to cause the shaft to rotate, and when the control plates of the two devices are initially in a non-neutral position, the ball bearing units within the devices will travel on shaft 10 in a helical pattern either to the left or to the right, depending on the initial positioning of the control plates as explained above in connection with FIGS. 6a, 6b and 6c. When linear motion with respect to the shaft 10 is thus produced the roller 42 will travel along the edges of the cutout portion 44. It will be recognized that the cutout portion 44 defines a time-motion cam control for roller 42. Variations of this type of cam control are well known to those skilled in the art. The roller 42 may be firmly held against the periphery of the cutout portion 44 by the use of well-known pneumatic, solenoid or other devices (not shown) which will prevent the roller from damping out, i.e., seeking a neutral position during operation. The rotation of the two control plates will thus cause the ball bearing units to reposition themselves according to the predetermined path dictated by the pattern of the cutout portion 44 in cam template 43. Mounted on the two units of the device of the invention, and made integral thereto, is a housing 45. Secured to housing 45 is a cylindrical bushing or bearing member 46 for holding a shaft or spindle 47 of a drill 48. By the linear motion of the two units of the motion translating device of the invention, drill 48 is caused to move in parallel direction. The drill may be independently powered in any conventional manner, for example, the drill may be operated by compressed air or it may be driven directly through V-belt connection with motor 38. It is clear that the device described and shown in FIG. 7 may be used for automatically drilling or otherwise working on a large number of production units in an assembly line where one or more holes are to be repeatedly drilled into the product.

An automatic drill mechanism similar to that shown in FIG. 7 was made and operated for more than one million drill cycles, at about 50 drill cycles per minute. The drill mechanism was found to operate entirely satisfactorily and substantially as described above. Although two units of the device of the invention were used in that drill mechanism, it should be understood that the number of units used is governed by space and thrust requirements and may be readily varied.

Figure 8:
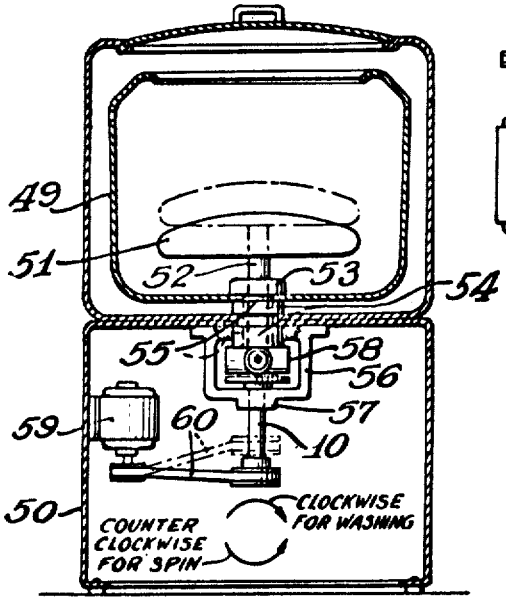
FIG. 8 is a schematic view showing the use of the device of the invention in an automatic laundry washer.

FIG. 8 shows a schematic view of a washing machine partly in section. It is well known that a tumbling action or reciprocating vertical motion within the washing tub is sometimes desirable. Such a vertical motion is easily obtainable by use of a form of the device of the present invention. Referring to FIG. 8, 49 designates a washing tub or the portion of a washing machine in which the soiled garments are washed, and 50 represents the lower housing of the washing machine wherein the mechanisms for operating the washing machine are located. Within the washing tub 49, there is an agitating or tumbling element 51 which is mounted on a shaft 52 extending upwardly through a one-way clutch 54 to permit the shaft to both rotate and to have a vertical motion. The one-way clutch is of the type that prevents rotational motion of a sleeve 55 in one direction but permits its rotational motion in the opposite direction. The washing tub 49 is mounted on a flange 53 of the sleeve 55. Tumbler shaft 52 extends slidably and rotationally through the sleeve 55. The one-way clutch 54 guides shaft 10 into operative engagement with the sleeve 55 and thereby with washing tub 49. A supporting bracket element 56 is mounted on the inside ceiling of housing 50 to support and guide shaft 10 by means of a bearing member 57 attached to the bottom surface of bracket 56. A unit 58 of the device of the invention as illustrated in FIG. 1 is mounted on shaft 10 within bracket 56. Shaft 10 is caused to rotate by motor 59 and belt and pulley means 60. When the motor 59 is rotating in one direction the unit 58 causes a tumbling action through shaft 10 communicating with tumbler shaft 52. The one-way clutch 54 avoids any rotational movement of shaft 10 or tumbler 51 during the washing cycle. The unit 58 is held stationary within bracket means 56. The belt and pulley means 60 and the tumbling element 51 thus move in a vertical direction as illustrated by the dash-lines in FIG. 8 during the washing cycle. Reversal of the motor 59 causes the unit 58 to assume a neutral position hence high speed spin drying may be accomplished without any tumbling action. The one-way clutch 54 provides operative engagement between shaft 10, sleeve 55 during the high speed drying cycle. It is to be noted that the vertical displacement of the shaft is only of the order of magnitude of a couple of inches, which is relatively small as compared to the diameter of the washing machine so that the belt and pulley means 60 can withstand the slight twisting action caused by the vertical motion during the washing cycle.

Figure 9:
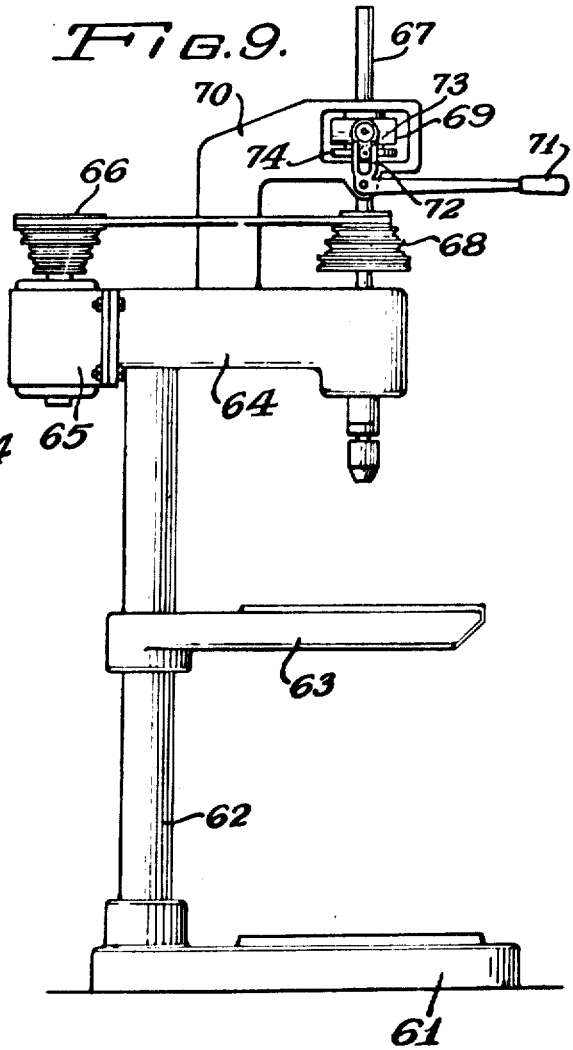
FIG. 9 is a schematic view showing the application of the device of the invention in a semi-automatic drill.

FIG. 9 shows an embodiment of the invention being used in a semi-automatic drill press. The drill press is shown generally as having a base 61, a vertical supporting column 62 extending upwardly from the base, a work supporting platform 63 attached horizontally to column 62 at a point above the base. A bracket 64 is mounted near the top of the column 62 for supporting the working elements of the drill press. A motor 65 is attached to one end of bracket 64 for powering belt and pulley means 66 which rotates a shaft 67 through pulley means 68. Shaft 67 has the drill tool attached to its lower end and the shaft is caused to travel in a vertical direction by a unit of the device of the invention 69 mounted on a support 70 attached to bracket 64. A handle 71 is shown operatively connected to a U-shaped level 72 for laterally steering guide roller 73 along a slot 74. Guide roller 73 corresponds in function to the roller 42 in FIG. 7. Thus, by means of handle 71 the drill press is semi-automatically operated.

Figure 10:
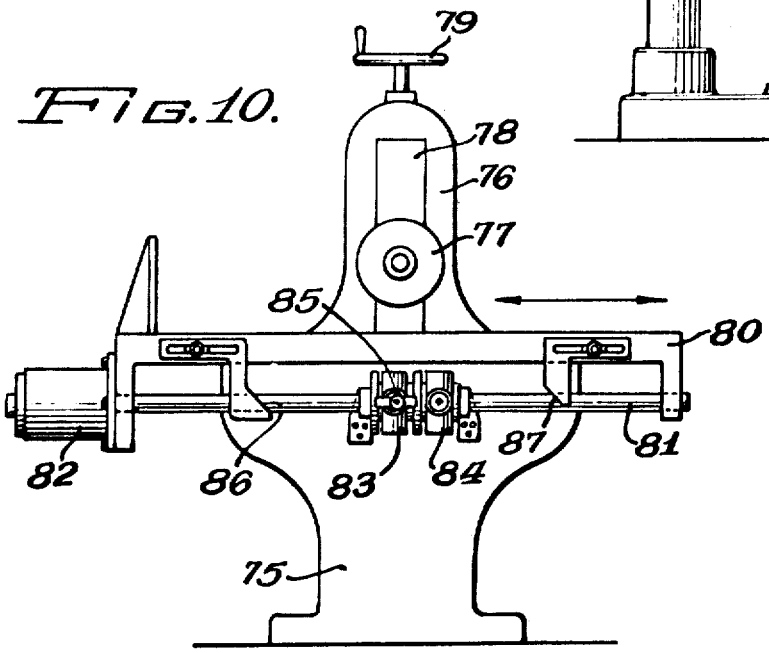
FIG. 10 is a schematic view of a surface sander or grinder employing an embodiment of the present invention.

Turning to FIG. 10, there is shown a surface sander or grinder employing an embodiment of the present invention. The surface sander of FIG. 10 consists of a base 75 supporting a frame member 76 having mounted thereon a sanding element 77 which may be adjustably raised or lowered along a slot 78 by hand-operated turning means 79. The sanding element 77 is rotated by a motor not shown. Slideably and horizontally mounted on base 75 is a table 80 having shaft 81 rotatably attached thereto. Shaft 81 is connected to a motor 82 for rotating the shaft. Two units 83 and 84 of the device of the invention are rigidly attached to each other and to the base 75. Shaft 81 is inserted through the two units 83 and 84 and in engaging connection therewith. When motor 82 is turned on to rotate the shaft 81, the shaft and the table 80 move back and forth in a horizontal direction while the two units 83 and 84 are held stationary with respect to the base 75. Guide roller 85 on the two units of the device of the invention is controlled by cams 86 and 87 attached to table 80 for reversing the direction of travel of the shaft and the table. As heretofore discussed, the cam roller is firmly controlled by well-known cam actuator devices (pneumatic, solenoid, etc.) to prevent damping of the cam action toward a neutral position. In this manner, any work piece clamped onto table 80 may be subjected to repeated sanding activity by sanding element 77.

Figure 11:
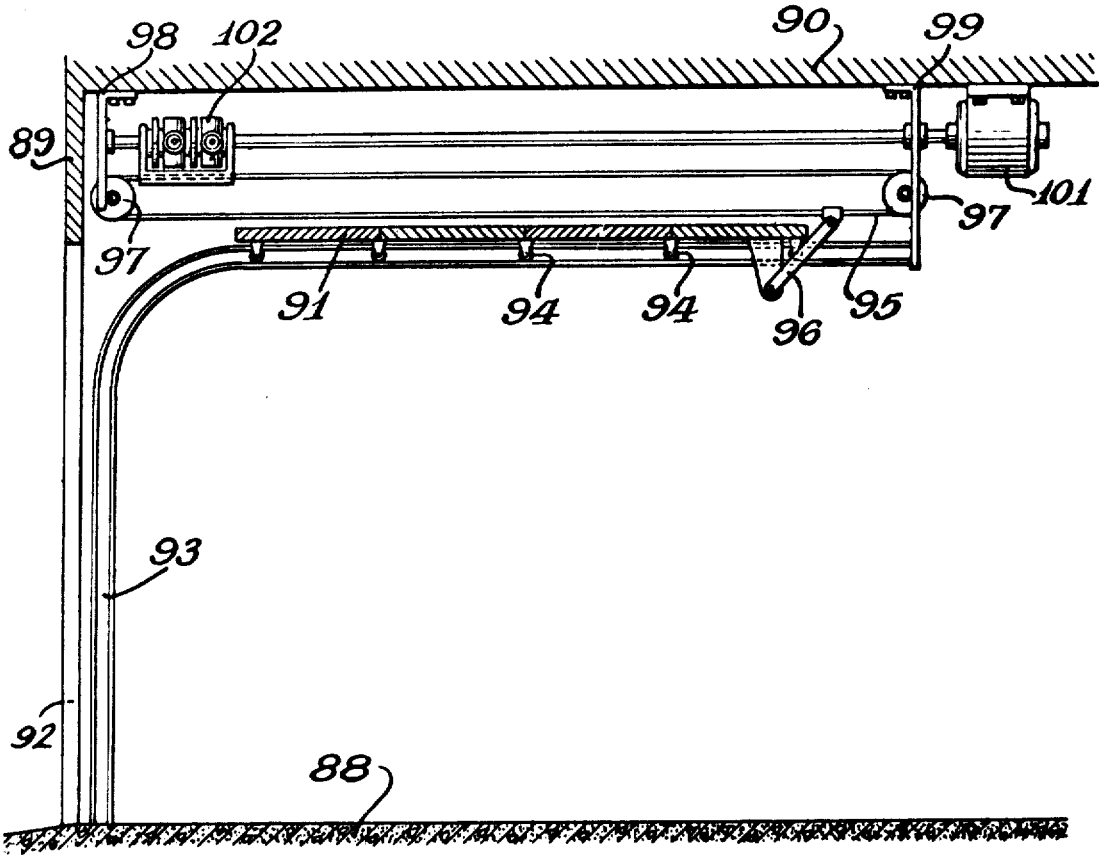
FIG. 11 is a schematic view of a garage door opener using an embodiment of the present invention.

FIG. 11 shows a garage door opener using an embodiment of the present invention. In FIG. 11, a garage for housing an automobile is shown constructed on a floor 88 and having vertical walls 89 (only a portion of the front wall is shown) and a ceiling 90. A sectioned door 91 is in entrance 92, mounted on tracks 93 via bracket and roller means 94. The upper end of door 91 is attached to an endless cable 95 through bracket and pivoting element 96 so that the door will move along tracks 93 when the cable is moved in a horizontal direction. Cable 95 is supported on two pulleys 97 mounted on bracket means 98 and 99. The two bracket means are attached to the ceiling of the garage and they also support a rotatable shaft 100. Shaft 100 is rotatably mounted on the bracket means and rotated by a motor 101. Two units of the device of the invention 102 are mounted over shaft 100 and fixedly attached to a point on cable 95. Thus, when the shaft 100 is rotated the motion translating device 102 travels horizontally along the shaft and pulls the cable in the same direction. In this manner, the section door 91 is moved long tracks 93 in accordance with the motion of the device 102.

Figure 12:
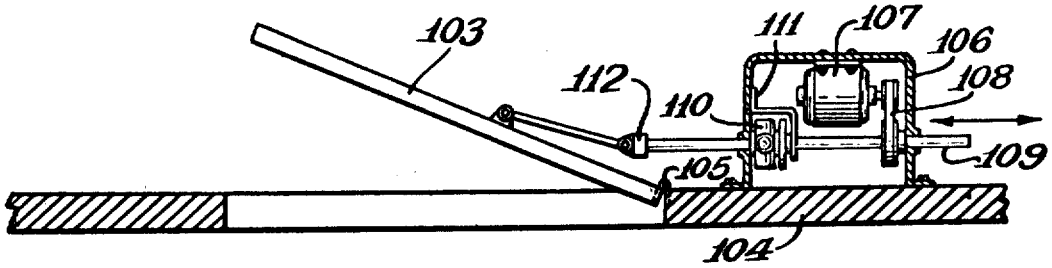
FIG. 12 is a schematic view of a swinging door opener using an embodiment of the present invention.

Finally, FIG. 12 shows a swinging door opening device using an embodiment of the present invention. In FIG. 12, a door 103 is swingably mounted to a wall 104 through hinges 105. A housing 106 is attached to the wall and contains a motor 107, belt and pulley means 108, a rotatable shaft 109 and a unit of the motion translating device of the invention 110. Shaft 109 is rotatably and slidably mounted on the housing but the unit 110 is prevented from linear motion by a bracket 111 attached to the housing. Shaft 109 is attached to the door through a bearing element 112 which permits the shaft to both rotate and to move laterally. By this arrangement, it can be seen that the door 103 can be opened and closed by an electric eye and its associated electronic circuitry which would then activate the motor 107.

The invention has been described in detail with particular reference to specific and preferred embodiments thereof, but it will be understood that variations and modifications can be effected within the spirit and scope of the invention as described hereinabove and as defined in the appended claims.

What is claimed is:

[1. A device for converting a torque force into a linear force directed parallel to the axis of the torque force comprising, in combination: a rotatable shaft onto which a torque force is applied; a frame closely surrounding the shaft and defining therein a plurality of socket defining portions; each of said socket defining portions containing an elongated pivotable bearing housing; a bearing of smaller exterior diameter than the diameter of said housing mounted in and substantially surrounded by said housing and said socket defining portion; each of said bearings having the periphery of its outer race engaging the periphery of the shaft, to be rotatably driven relative to said shaft about its own axis but being movable axially of the rotatable shaft; said bearing having surfaces in contact with said housing for transmitting forces to said housing; said housing having an exterior surface, at least a part of said surface is no farther from said rotatable shaft than the axis of said bearing and said part being in contact with said socket defining portion, for transmitting forces parallel to the axis of the rotatable shaft to said socket defining portion; pivot means for pivoting each bearing about the axis of the pivotable housing in which it is enclosed, so that a force component is transmitted from the rotatable shaft to the bearing and thence to the frame which is manifested by development of a force parallel to the axis of the shaft which tends to effect relative movement between the shaft and frame in directions axially of the shaft; and controller means for selectively effecting substantially identical pivoting of all bearings simultaneously.]

[2. A device as in claim 1 wherein the bearing is slidably mounted radially of the rotatable shaft in said socket defining portion and connecting means serving as the pivot axis of the bearing and extending outwardly of the frame and connecting said bearing to said controller means whereby the position of the bearing in said socket defining portion may be controlled by said controller means.]

[3. A device as in claim 1 wherein the pivot means for pivoting each bearing includes an axial pin concentrically associated with said bearings, and projecting generally axially relative to the shaft to a point where it is engaged by the controller means.]

[4. A device as in claim 1 wherein the frame includes a plurality of socket-defining portions disposed radially of the shaft, each socket-defining portion having an inner cylindrical wall whose longitudinal axis is perpendicular to the axis of the shaft, a bearing carrier journalled in said cylindrical wall of the socket and having therein a bore whose axis is perpendicular to the longitudinal axis of the socket and a slot-like recess for slidably receiving a bearing, a pin in said bore having the bearing mounted thereon and serving both to maintain the bearing carrier spaced from the shaft when the bearing engages the shaft and serving as a lever for selectively pivoting the bearing about an axis perpendicular to the shaft.]

[5. A device as in claim 4 including selectively variable force means carried on the socket-defining portion and engaging the bearing carrier.]

[6. A device as in claim 1 wherein the frame includes a plurality of radially movable parts operatively associated with the bearings and having portions arranged to engage each other when the shaft is withdrawn from the frame, so as to maintain the bearings at a position to permit of re-entry and re-assembly of the shaft into the frame and between the bearings, and the bearings when operatively engaging the shaft serving to space said radially movable parts from said shaft and from each other.

[7. In a washing machine of the type having an agitator connected to a vertical shaft, said vertical shaft and said agitator having a vertical reciprocating tumbling action during the washing and a spinning action during the drying cycle of said washing machine, the improvement consisting of the device as in claim 1 wherein said vertical shaft is operatively connected through a one-way clutch to said rotatable shaft, an agitator operatively connected to said vertical shaft, so that when clockwise rotary motion is imparted to said shaft and said frame is held motionless, said vertical shaft and said agitator move vertically reciprocally according to a programmed pattern whereby a tumbling action is obtained and when a counterclockwise rotary motion is imparted to said shaft and said frame is held motionless, said vertical shaft and said agitator rotate at high speed without a tumbling action.]

[8. A device as in claim 2 including selectively variable force means carried on the socket-defining portion and operatively engaging said bearing assembly.]

[9. A device as in claim 1 wherein each of said bearing housing includes a radially movable means having portions arranged to engage each other when the shaft is withdrawn from the frame, so as to maintain the bearings at a position to permit the re-entry and reassembly of the shaft into the frame and between the bearings, and the bearings when operatively engaging the shaft serving to space said radially movable means from said shaft and from each other.]

10. A device for converting a torque force into a linear force directed parallel to the axis of the torque force comprising, in combination: a rotatable shaft onto which a torque force is applied, a frame surrounding the shaft, said frame including a plurality of similar bearings each having its outer race peripherally engaging the periphery of the shaft, to be rotatably driven relative to said shaft about its own axis but being movable axially of the shaft, pivot means for pivoting each bearing about an axis that is perpendicular to both the axis of the bearing and the axis of the shaft, so that a force component is transmitted from the shaft to the bearing which is manifested by development of a force parallel to the axis of the shaft which tends to effect relative movement between the shaft and frame in directions axially of the shaft, and controller means for selectively effecting substantially identical pivoting of all bearings simultaneously, said frame is elongated axially of the shaft to provide first and second frame ends having respectively first and second portions adapted for engagement and cooperation with second and first portions on adjacent similar frames, so as to afford multiplying the number of frames on a shaft for multiplying the linear force derivable from the torque force, and means interconnecting the controllers of each frame to cause said controllers to be moved identically in unison.

[11. A device for converting a torque force into a linear force directed parallel to the axis of the torque force comprising, in combination: a rotatable shaft onto which a torque force is applied, a frame surrounding the shaft, said frame including a plurality of similar bearings each having its outer race peripherally engaging the periphery of the shaft, to be rotatably driven relative to said shaft about its own axis but being movable axially of the shaft, pivot means for pivoting each bearing about an axis that is perpendicular to both the axis of the bearing and the axis of the shaft, so that a force component is transmitted from the shaft to the bearing which is manifested by development of a force parallel to the axis of the shaft which tends to effect relative movement between the shaft and frame in directions axially of the shaft, and controller means for selectively effecting substantially identical pivoting of all bearings simultaneously, and guide means extending parallel to said shaft and spaced therefrom and cooperating with the frame to prevent rotation of the frame relative to the shaft but accommodating movement of the frame axially of the shaft.]

[12. A device as in claim 11 in combination with second control means engaging the controller for selectively moving the controller relative to the frame, and positioning means operatively associated with the second control means for effecting pre-determined positioning of the controller depending upon the location of the frame axially of the shaft.]

[13. In a drilling machine of the type having a controllable reciprocating drill spindle the improvement consisting of the device as in claim 12 operatively connected to said reciprocating drill spindle so that when said shaft is held axially motionless and rotational motion is imparted to said shaft, said frame moves axially relative to said shaft according to a programmed pattern whereby a drill operatively connected to said drill spindle can perform a drilling function.]

[14. A threadless screw device having a shaft and a roller assembly, said roller assembly including a holder and a plurality of rollers mounted in said holder and engaging said shaft, the improvement comprising a carrier for each roller journaled in said holder, said holder providing a bore for each carrier, and said carrier having cylindrical surface portions engaging the wall of said bore at a position which is no farther from the shaft than the axis of the rollers, each roller being rotatably mounted within a carrier and surrounded by said bore, means extending transversely from each carrier for maintaining the axis of each roller in a predetermined angular relationship to a plane which includes the axis of said shaft, and means urging each roller into engagement with the surface of said shaft.]

[15. A threadless screw device as claimed in claim 14 in which said transversely extending means extends in a direction generally parallel to the axis of said shaft, and control means rotatably mounted on said holder and engaging said transversely extending means so that in one angular position of said control means, said shaft axis and the axes of all of said rollers will be parallel to each other, whereby angular adjustment of said control means with respect to said holder will cause a uniform inclination of said roller axes with respect to said shaft axis.]

[16. A threadless screw device as claimed in claim 15 which includes a pin mounted in each carrier, each roller being journaled on a pin, said transversely extending means constituting an extended portion of each pin, the extended portion of each pin, terminating in a spherical portion, and said control means including a plurality of slotted portions, each one receiving one of said spherical portions.]

[17. A threadless screw device as claimed in claim 14 in which said holder is provided with an opening receiving said shaft, said bores being oriented perpendicular to the axis of said shaft and intersecting same, said bores being of a length greater than the axial length of said carriers, confining means located in each bore outwardly of said carrier, said roller urging means comprising a spring confined between each confining means and the carrier located in said bore.]

[18. A threadless screw device as claimed in claim 17 in which said carrier is a cylindrical member having a chamfered inner edge, said chamfered edges being normally spaced from each other, but engaging each other in abutting contact.]

[19. A threadless screw device as claimed in claim 17 in which said confining means comprises a screw threaded plug threaded into the outer end of each bore, a disc overlying said carrier, a ball bearing unit overlying said disc, and said spring means comprising a spring washer having its peripheral face portion engaging said ball bearing unit, and its central portion engaging said plug, said plug constituting means for adjusting the compression of said spring washer.]

[20. A threadless screw device as claimed in claim 14 in which said holder is provided at one end with a hub, and a sleeve at the other end of said holder having an inner surface of a diameter equal to the diameter of the outer surface of said hub.]

[21. A threadless screw device as claimed in claim 15 in which said holder is provided at one end with a hub, said control member comprising a slotted disc mounted on said hub for angular adjustment, and a collar at the other end of said holder having an inner surface of a diameter equal to the diameter of the outer surface of said hub.]

22. A threadless screw device comprising a roller assembly, said roller assembly comprising a holder having an opening for receiving a shaft and a plurality of radially extending bores oriented perpendicular to the axis of said shaft opening and intersecting same, a carrier journaled in each bore for angular adjustment about an axis perpendicular to said shaft opening axis, each carrier having an axial opening, a roller located in said opening and having a portion extending beyond the inner end of said carrier, a pin extending transversely through said carrier and said roller and providing a mounting for said roller, a slot in the wall of each bore, each pin having an extended portion extending through one of said slots, said slots extending in a direction substantially parallel to said shaft opening axis and being larger than the diameter of said pin to permit axial and angular displacement of said pin and carrier with respect to the axis of said bore, said holder including a hub, and control means rotatably mounted on said hub and including means engaging said pins so that in one angular position of said control means said shaft opening axis and the axis of said pins will all be parallel to each other, whereby angular adjustment of said control means with respect to said hub will cause a uniform inclination of said roller axes with respect to said shaft axis, confining means located in the outer end of each bore, and spring means confined between each confining means and its associated carrier to urge each carrier inwardly in said bore.

23. A threadless screw device as claimed in claim 22 in which the engagement of said pin with one wall of the slot limits inward displacement of said carrier by said spring means.

*24. A device for converting a torque force into a linear force directed parallel to the axis of the torque force comprising, in combination: a rotatable shaft onto which a torque force is applied, a frame closely surrounding the shaft and defining therein a plurality of socket defining portions, each of said socket defining portions containing an elongated pivotable bearing housing, a bearing of smaller exterior diameter than the diameter of said housing mounted in and substantially surrounded by said housing and said socket defining portion, each of said bearings having the periphery of its outer race engaging the periphery of the shaft, to be rotatably driven relative to said shaft about its own axis but being movable axially of the rotatable shaft, said bearing having surfaces in contact with said housing for transmitting forces to said housing, said housing having an exterior surface, at least a part of said surface being no farther from said rotatable shaft than the axis of said bearing and said part being in contact with said socket defining portion, for transmitting forces parallel to the axis of the rotatable shaft to said socket defining portion, pivot means for pivoting each bearing about the axis of the pivotable housing in which it is enclosed, so that a force component is transmitted from the rotatable shaft to the bearing and thereafter to the frame which is manifested by development of a force parallel to the axis of the shaft which tends to effect relative movement between the shaft and frame in directions axially of the shaft, controller means for selectively effecting substantially identical pivoting of all bearings simultaneously, said pivot means for pivoting each bearing including an axial pin concentrically associated with each of said bearings and being connected to each of said housings on opposite sides of said bearing, said housings supporting said pins to substantially avoid moment forces which could break said pins, and each pin projecting generally axially relative to the shaft and being engaged by said controller means.*

*25. The device of claim 24 wherein said frame includes a plurality of socket defining portions disposed radially of the shaft, each socket defining portion having an inner cylindrical wall whose longitudinal axis is perpendicular to the axis of said shaft, said bearing housing being held in said cylindrical wall of said socket and having therein a bore whose axis is perpendicular to the longitudinal axis of said socket and a slot-like recess for slidably receiving a bearing, and said pin being in said bore and having the bearing mounted thereon and serving both to maintain the bearing housing spaced from said shaft when the bearing engages the shaft and serving as a lever for selectively pivoting the bearing about an axis perpendicuar to said shaft.*

*26. The device of claim 25 including a selectively variable force means carried on the socket-defining portion and engaging the bearing carrier.*

*27. The device of claim 24 wherein the frame includes a plurality of radially movable parts operatively associated with the said bearings and having portions arranged to engage each other when the shaft is withdrawn from said frame so as to maintain said bearings at such a position as to permit re-entry and re-assembly into said frame and between said bearings, and said bearings when operatively engaging the shaft serving to space said radially movable parts from said shaft and from each other.*

*28. In a washing machine of the type having an agitator connected to a vertical shaft, said vertical shaft and said agitator having a vertical reciprocating tumbling action during the washing and a spinning action during the drying cycle of said washing machine, the improvement con-*

*sisting of a device for converting a torque force into a linear force directed parallel to the axis of the torque force comprising, in combination, a rotatable shaft on which force is applied, a frame closely surrounding the shaft and defining therein a plurality of socket defining portions, each of said socket defining portions containing an elongated pivotable bearing housing, a bearing of smaller exterior diameter than the diameter of said housing mounted in and substantially surrounded by said housing and said socket defining portion, each of said bearings having the periphery of its outer race engaging the periphery of said shaft, to be rotatably driven relative to said shaft about its own axis but being movable axially of the rotatable shaft, said bearing having surfaces in contact with said housing for transmitting forces to said housing, said housing having an exterior surface, at least a part of said surface being no farther from said rotatable shaft than the axis of said bearing and said part being in contact with said socket defining portion, for transmitting forces parallel to the axis of the rotatable shaft to said socket defining portion, pivot means for pivoting each bearing about the axis of the pivotable housing in which it is enclosed, so that a force component is transmitted from the rotatable shaft to the bearing and then to the frame which is manifested by development of a force parallel to the axis of the shaft which tends to effect relative movement between the shaft and the frame in a direction axially of the shaft, and controller means for selectively effecting substantially identical pivoting of all bearings simultaneously, said vertical shaft being operatively connected through a one-way clutch to said rotatable shaft, an agitator operatively connected to said vertical shaft, so that when clockwise rotary motion is imparted to said shaft and said frame is held motionless, said vertical shaft and said agitator move vertically reciprocally according to a programmed pattern whereby a tumbling action is obtained and when a counterclockwise rotary motion is imparted to said shaft and said frame is held motionless, said vertical shaft and said agitator rotate at high speed without a tumbling action.*

*29. The device of claim 24 wherein two pairs of opposed socket-defining portions containing said bea ing housings and said bearings are provided.*

*30. The device of claim 24 wherein each bearing housing is a cylindrical member having a chamfered inner edge, said chamfered edges being normally spaced from each other, but engaging each other in abutting contact.*

*31. The device of claim 24 including a screw th eaded plug threaded into the outer end of each socket defining portion, a disc overlying said bearing housing, said bearing overlying said disc, and a spring washer having its peripheral face engaging said ball bearing unit, and its central portion engaging said plug, said plug constituting means for adjusting the compression of said spring washer.*

*32. The device of claim 24 wherein said frame is provided at one end with a hub, and a sleeve at the other end of said frame having an inner surface of diameter equal to the diameter of the outer surface of said hub.*

*33. The device of claim 24 wherein said frame is provided at one end with a hub, said controller means comprising a slotted disc mounted on said hub for angular adjustment, and a sleeve at the other end of said holder having an inner surface of a diameter equal to the diameter of the outer surface of said hub.*

References Cited

The following references, cited by the Examiner, are of record in the patented file of this patent or the o iginal patent.

UNITED STATES PATENTS

| | | | |
|---|---|---|---|
| 3,424,012 | 1/1969 | Hirmann | 74—25 |
| 2,578,026 | 12/1951 | Taylor | 74—25 |
| 3,046,800 | 7/1962 | Pravel | 74—25 |
| 3,272,021 | 9/1966 | Webster | 74—25 |

MILTON KAUFMAN, Primary Examiner

W. S. RATLIFF, Jr., Assistant Examiner